United States Patent
Jang et al.

(10) Patent No.: US 9,618,781 B2
(45) Date of Patent: Apr. 11, 2017

(54) DISPLAY DEVICE AND METHOD OF MANUFACTURING THE SAME

(71) Applicant: LG Display Co., Ltd., Seoul (KR)

(72) Inventors: Chang Soo Jang, Goyang-si (KR); Sung-Eui Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 26 days.

(21) Appl. No.: 13/941,096

(22) Filed: Jul. 12, 2013

(65) Prior Publication Data

US 2014/0043560 A1 Feb. 13, 2014

(30) Foreign Application Priority Data

Aug. 10, 2012 (KR) ........................ 10-2012-0087655

(51) Int. Cl.
| | |
|---|---|
| *G02F 1/1333* | (2006.01) |
| *H05K 5/02* | (2006.01) |
| *G02F 1/1335* | (2006.01) |
| *G06F 1/16* | (2006.01) |

(52) U.S. Cl.
CPC .. *G02F 1/133308* (2013.01); *G02F 1/133608* (2013.01); *G06F 1/1601* (2013.01); *H05K 5/02* (2013.01); *G02F 2001/133314* (2013.01); *G02F 2001/133325* (2013.01); *G02F 2201/503* (2013.01); *G02F 2202/28* (2013.01)

(58) Field of Classification Search
CPC .. G02F 1/133308; G02F 2001/133314; H05K 5/02
USPC ...................................... 349/60, 58; 445/24
See application file for complete search history.

(56) References Cited

U.S. PATENT DOCUMENTS

| | | | | |
|---|---|---|---|---|
| 4,510,984 A | * | 4/1985 | Kishida | ................... B60C 15/06 |
| | | | | 152/541 |
| 4,740,657 A | * | 4/1988 | Tsukagoshi | .............. H01B 1/22 |
| | | | | 174/84 R |
| 5,089,750 A | * | 2/1992 | Hatada | .............. H01L 21/67144 |
| | | | | 228/180.21 |
| 5,869,150 A | | 2/1999 | Iwamoto | |
| 6,847,415 B1 | * | 1/2005 | Yoshimura | .......... G02F 1/13452 |
| | | | | 349/149 |

(Continued)

FOREIGN PATENT DOCUMENTS

| | | |
|---|---|---|
| CN | 1118075 A | 3/1996 |
| CN | 101037574 A | 9/2007 |

(Continued)

OTHER PUBLICATIONS

Office Action for Chinese Patent Application No. CN 201310208104.7, Aug. 13, 2015, 16 pages.

*Primary Examiner* — Sang V Nguyen
(74) *Attorney, Agent, or Firm* — Fenwick & West LLP (57) ABSTRACT

A display device includes a display panel including an upper substrate and a lower substrate facing and coupled to a rear surface of the upper substrate, a guide frame supporting the display panel, and a coupling member coupling the guide frame to the display panel. The coupling member includes an adhesive member providing adhesive strength and at least one or more buffer members which are disposed inside the adhesive member and have an elastic force. Accordingly, the display device can absorb an impact applied to the display panel, thus enhancing the stability of the display panel.

18 Claims, 7 Drawing Sheets

(56) References Cited

U.S. PATENT DOCUMENTS

| | | | |
|---|---|---|---|
| 2001/0027876 A1* | 10/2001 | Tsukamoto | H01L 21/6835 174/260 |
| 2002/0067457 A1* | 6/2002 | Mase | G02F 1/13452 349/155 |
| 2005/0099402 A1* | 5/2005 | Nakanishi | G06F 3/0412 345/173 |
| 2006/0087932 A1* | 4/2006 | Hayashi | G02B 7/02 369/44.14 |
| 2007/0002206 A1* | 1/2007 | Shirai | G02F 1/133308 349/58 |
| 2007/1021827 | 9/2007 | Hiramatsu et al. | |
| 2008/0084520 A1* | 4/2008 | Nam et al. | 349/65 |
| 2009/0004944 A1* | 1/2009 | Tannas, Jr. | G02F 1/133351 445/2 |
| 2009/0207560 A1* | 8/2009 | Lee | 361/679.01 |
| 2010/0134459 A1* | 6/2010 | Kawada | 345/211 |
| 2010/0221533 A1* | 9/2010 | Tatsuzawa | H05K 3/323 428/343 |
| 2010/0243303 A1* | 9/2010 | Arifuku | C08G 73/1039 174/258 |
| 2012/0230016 A1* | 9/2012 | Hashino | G02B 6/0088 362/97.1 |
| 2012/0300153 A1* | 11/2012 | Fujii et al. | 349/58 |
| 2013/0070189 A1* | 3/2013 | Li | 349/113 |
| 2013/0135555 A1* | 5/2013 | Chen | B29C 70/745 349/60 |
| 2013/0140083 A1* | 6/2013 | Izawa | C09J 1/00 174/94 R |
| 2013/0182198 A1* | 7/2013 | Chang | G02F 1/133615 349/58 |
| 2013/0335669 A1* | 12/2013 | Chen et al. | 349/58 |

FOREIGN PATENT DOCUMENTS

| | | |
|---|---|---|
| CN | 102346322 A | 2/2012 |
| CN | 102402038 A | 4/2012 |
| JP | 2010-060591 A | 3/2010 |

* cited by examiner

FIG. 1

[ Related Art ]

DISPLAY DEVICE AND METHOD OF MANUFACTURING THE SAME

CROSS-REFERENCE TO RELATED APPLICATIONS

This application claims the benefit of the Korean Patent Application No. 10-2012-0087655 filed on Aug. 10, 2012, which is hereby incorporated by reference as if fully set forth herein.

BACKGROUND

Field of the Invention

The present invention relates to a display device from which some cases and set covers have been removed and a method of manufacturing the same.

Discussion of the Related Art

Recently, flat panel display devices that have reduced weight and volume are being developed. Liquid crystal display (LCD) devices, plasma display panels (PDPs), field emission display (FED) devices, and light emitting display devices are actively being researched as flat type display devices. However, among such flat panel display devices, LCD devices are easily manufactured, have good drivability of drivers, realize a high-quality image, and thus are attracting much attention.

In terms of technology and design interesting to consumers, recently, research and development of flat panel display devices are increasingly required. Therefore, efforts are being continuously made for reducing the thicknesses of display devices, and research is increasingly conducted on a design with enhanced aesthetic appearance that can induce consumers to buy by appealing to the consumers' sense of beauty.

However, in design development for enhancing a scene of beauty or slimming of display devices that have been made to date, elements of a related art display device have been used as is, while the structures of the elements have been changed. Due to these reasons, there are limitations to slimming display devices and developing new designs of the display devices.

For example, in LCD devices of the related art, a lower case and a front case are necessarily used for receiving a liquid crystal display panel and a backlight unit, and moreover, a separate front set cover and rear set cover are additionally used for applying the LCD devices to notebook computers, monitors, mobile devices, televisions, etc.

As described above, display devices of the related art necessarily use the front set cover and rear set cover as well as the lower case and front case, and consequently, there are limitations in reducing the thicknesses of LCD devices or changing the designs thereof. Particularly, the front set cover and rear set cover necessarily cover a top edge of a liquid crystal display panel. Due to this reason, the thicknesses of display devices inevitably become thicker, and moreover, the border widths of the display devices enlarge. In addition, it is difficult to realize various innovative designs due to a step height in a border portion.

Hereinafter, a related art LCD device will be described in detail with reference to the drawing.

Figure 1:
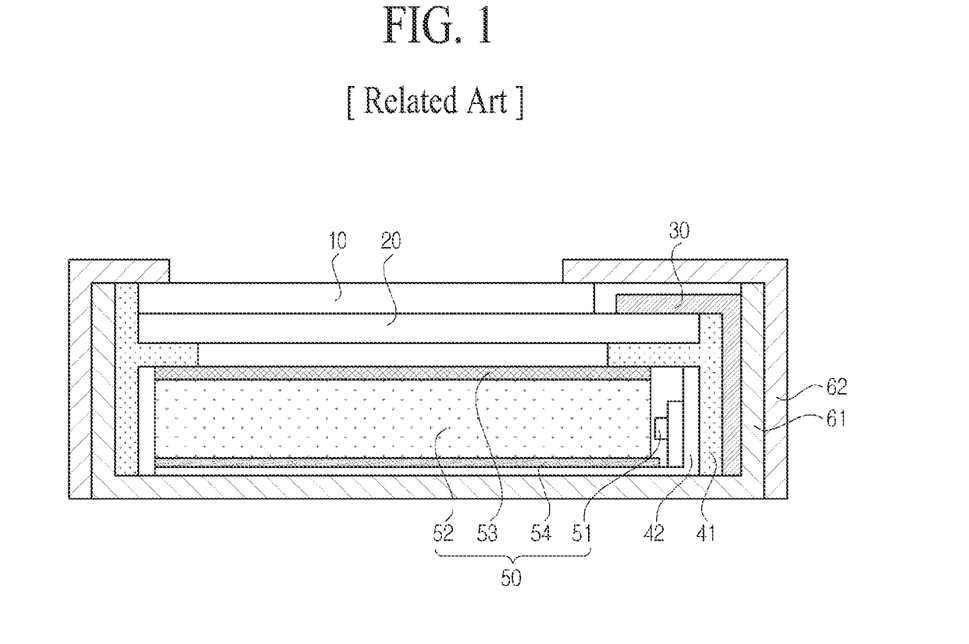
FIG. 1 is a sectional view schematically illustrating a related art LCD device.

FIG. 1 is a sectional view schematically illustrating a related art LCD device.

As seen in FIG. 1, the related art LCD device includes an upper substrate 10, a lower substrate 20, a driver 30, a guide frame 41, a support case 42, a backlight unit 50, a lower cover 61, and an upper cover 62.

The upper substrate 10 and the lower substrate 20 are coupled to each other by a sealant, and a liquid crystal layer (not shown) is disposed between the two substrates 10 and 20.

Although not shown, a black matrix and a color filter are disposed in the upper substrate 10, and a gate line, a data line, a thin film transistor (TFT), and a pixel electrode are disposed in the lower substrate 20. Here, each of the elements is formed in plurality.

The driver 30 applies respective signals to the gate line and data line disposed in the lower substrate 20 to drive the LCD device. In order to apply the respective signals to the gate line and data line disposed in the lower substrate 20, a peripheral portion of one side of the lower substrate 20 is extended longer than a peripheral portion of one side of the upper substrate 10, and the driver 30 is connected to the long-extended peripheral portion of one side of the lower substrate 20.

The guide frame 41 guides respective positions of the coupled substrates 10 and 20 and the backlight unit 50, and the support case 42 supports the backlight unit 50.

The backlight unit 50 includes a light source 51, a light guide plate 52, an optical sheet 53, and a reflective sheet 54.

The lower cover 61 and the upper cover 62 surround all of the above-described elements, and act as covers of the LCD device.

In this case, the upper cover 62 covers a peripheral portion of a top of the upper substrate 10, and especially, peripheral portions of all four planes, thus preventing the driver 30 from being exposed to the outside and moreover preventing light from leaking from the peripheral portions of the upper substrate 10.

However, as described above, since the upper cover 62 surrounds all of the peripheral portions of the four planes of the upper substrate 10, step heights respectively occur in all of the four planes of the LCD device, and bezel widths of all of the four planes of the LCD device are enlarged, taking away from the aesthetic appearance of the LCD device.

SUMMARY

Accordingly, the present invention is directed to a display device and a method of manufacturing the same that substantially obviate one or more problems due to limitations and disadvantages of the related art.

An aspect of the present invention is directed to provide a display device and a method of manufacturing the same in which, by removing some cases and set covers, a thickness and a front border width are minimized, and a step height of a front border portion is removed.

Another aspect of the present invention is directed to a display device and a method of manufacturing the same in which a display panel is efficiently coupled to a guide frame.

Another aspect of the present invention is directed to a display device and a method of manufacturing the same in which a display panel and a guide frame maintain a constant interval therebetween, thereby absorbing impact.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a display panel including an upper substrate and a lower substrate facing and coupled to a rear surface of the upper substrate; a guide frame supporting the display panel; and a coupling member coupling the guide frame to the display panel, wherein the coupling member includes an adhesive member providing adhesive strength and at least one or more buffer members which are disposed inside the adhesive member and have an elastic force.

In another aspect of the present invention, there is provided a method of manufacturing a display device which includes: preparing a guide frame which exposes a side surface of a display panel and includes a horizontal part supporting a bottom of the display panel and a vertical part extended from the horizontal part; injecting a coupling member, which couples the guide frame to the display panel, onto the horizontal part; and coupling the guide frame to the display panel, wherein the coupling member is formed by combining at least one or more buffer members having an elastic force with an adhesive member providing adhesive strength.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a display device and a method of manufacturing the same according to the present invention will be described in detail with reference to the accompanying drawings.

Figure 2:
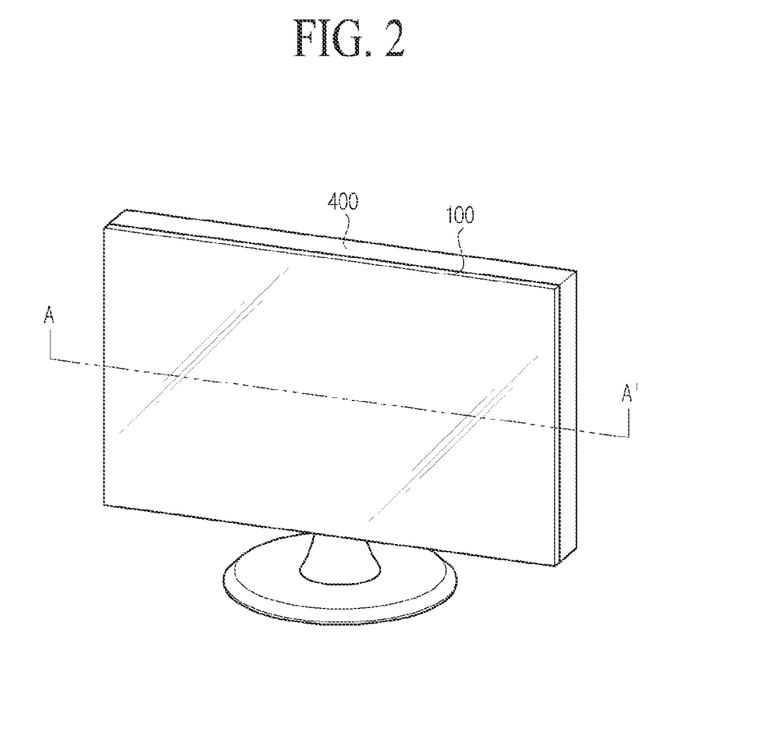
FIG. 2 is a perspective view illustrating an embodiment of a display device according to the present invention.
Figure 3:
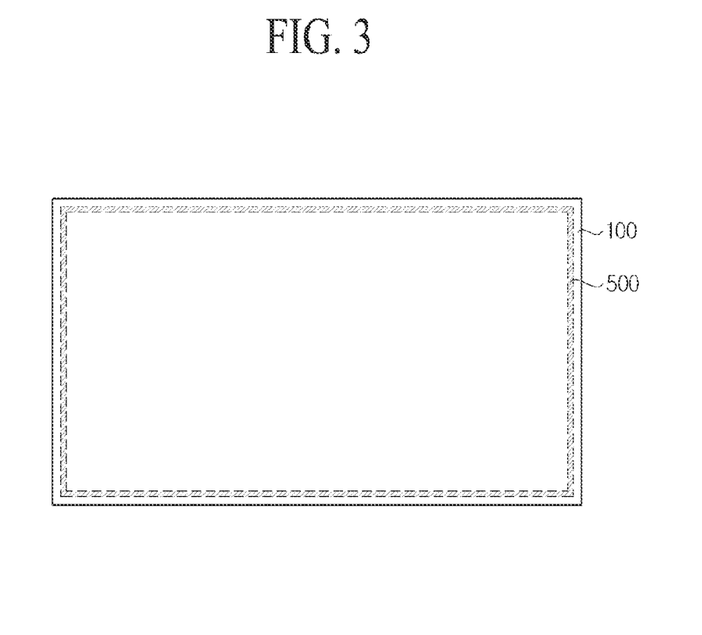
FIG. 3 is a plan view illustrating an embodiment of the display device of the present invention of FIG. 2.
Figure 4:
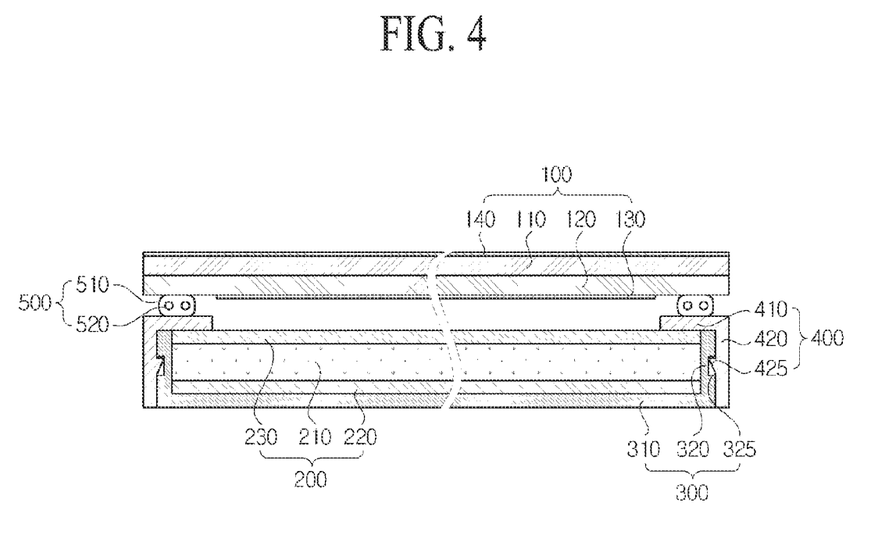
FIG. 4 is a sectional view illustrating an embodiment of a sectional plane taken along line A-A' of the display device of the present invention of FIG. 2.

FIG. 2 is a perspective view illustrating an embodiment of a display device according to the present invention. FIG. 3 is a plan view illustrating an embodiment of the display device of the present invention of FIG. 2. FIG. 4 is a sectional view illustrating an embodiment of a sectional plane taken along line A-A' of the display device of the present invention of FIG. 2.

As shown in FIGS. 2 to 4, the display device according to an embodiment of the present invention may include a display panel 100, a backlight unit 200, a cover member 300, and an adhesive member 400.

The display panel 100 may include an upper substrate 110, a lower substrate 120 facing and coupled to the upper substrate 110 with a liquid crystal layer (not shown) therebetween, a lower polarizing film 130 disposed at a rear surface of the lower substrate 120, and an upper polarizing film 140 disposed at a front surface of the upper substrate 110.

The lower substrate 120 includes a plurality of pixels (not shown) that are respectively formed in a plurality of areas defined by intersections between a plurality of gate lines (not shown) and a plurality of data lines (not shown). Each of the pixels may include a TFT (not shown) connected to a gate line and a data line, a pixel electrode connected to the TFT, and a common electrode that is formed adjacently to the pixel electrode and receives a common voltage. In this case, the common electrode may be formed in the upper substrate 110 depending on a liquid crystal driving mode for the liquid crystal layer. The lower substrate 120 generates an electric field corresponding to a difference voltage between a data voltage applied to each pixel and the common voltage, thereby adjusting light transmittance of the liquid crystal layer.

The upper substrate 110 includes a color filter corresponding to each pixel formed in the lower substrate 120, and faces and is coupled to the lower substrate 120 with the liquid crystal layer therebetween. In this case, a common electrode to which the common voltage is applied depending on a driving mode of the liquid crystal layer may be formed in the upper substrate 110. The upper substrate 110 filters light incident through the liquid crystal layer by using a plurality of the color filters, and emits certain color light to the outside, thereby allowing the display panel 100 to display a certain color image.

The lower substrate 120 and the upper substrate 110 may be formed in various types known to those skilled in the art, depending on the driving mode of the liquid crystal layer, for example, a twisted nematic (TN) mode, a vertical alignment (VA) mode, an in-plane switching (IPS) mode, and a fringe field switching (FFS) mode.

The lower polarizing film 130 may be adhered to a rear surface of the lower substrate 120. The lower polarizing film 130 is adhered to the rear surface of the lower substrate 120, and polarizes light irradiated from the backlight unit onto the display panel 100.

The upper polarizing film 140 is disposed at the front surface of the upper substrate 110, and polarizes light passing through the display panel 100.

Although not shown, a retarder film may be disposed at a top of the upper polarizing film 140. The retarder film may be adhered to the entire front surface of the upper polarizing film 140, and may include a plurality of first retarder patterns disposed at certain intervals and a plurality of second retarder patterns disposed at respective gaps between the plurality of first retarder patterns.

The retarder film is adhered to the entire front surface of the upper polarizing film 140, and segments a left-eye image and a right-eye image. To this end, the retarder film includes the plurality of first retarder patterns respectively overlapping vertical or horizontal lines of the display panel 100 displaying the left-eye image, and the plurality of second retarder patterns disposed at the respective gaps between the first retarder patterns respectively overlapping vertical or horizontal lines of the display panel 100 displaying the right-eye image. The first and second retarder patterns change an optical axis of each of the left-eye image and right-eye image, emitted from the display panel 100 to the outside, to other optical axis.

The backlight unit 200 includes a light guide plate 210, a reflective sheet 220, and an optical member 230 which are placed in the cover member 300.

The light guide plate 210 is disposed in a flat type (or a wedge type) and guides light, inputted from a light source (not shown) through a light incident surface, to the display panel 100. Here, the light source may include at least one fluorescent lamp or Light Emitting Diode (LED).

The reflective sheet 220 is disposed at a rear surface of the light guide plate 210 and reflects light, which is incident from the light guide plate 210, to the display panel 100.

The optical member 230 is disposed on the light guide plate 210 and enhances a luminance characteristic of light traveling from the light guide plate 210 to the display panel 100. To this end, the optical member 230 may include at least one diffusive sheet and prism sheet of a lower diffusive sheet, a lower prism sheet, an upper prism sheet, and an upper diffusive sheet.

The cover member 300 may include a set plate 310, a side part 320, and a first coupling part 325.

The cover member 300 receives the backlight unit 200, and aligns a position thereof. In an embodiment, the cove member 300 receives the backlight unit 200, and supports a side of the display panel 100 and a side of the guide frame 400, thereby acting as a backside product cover of a produced display device. However, in FIG. 4, the cover member 300 supports an inner side surface of the guide frame 400, but is not limited thereto. As another example, the cover member 300 may be disposed to support an outer side surface.

The set plate 310 is provided in a flat shape, and supports the backlight unit 200, thereby acting as a backside product cover of a produced display device. In an embodiment, the set plate 310 may be coupled to the guide frame 400 by a plurality of screws.

The side part 320 is formed to be bent vertically from an edge portion of the set plate 310. In an embodiment, the side part 320 may be provided to the same height as the backlight unit 200.

The first coupling part 325 is concavely formed to have a certain depth from an inner side wall of the side part 320 in correspondence with a second coupling part 425. Therefore, the second coupling part 425 is inserted into the first coupling part 325, thereby coupling the guide frame 400 and the cover member 300. Here, the stepped surface of the second coupling part 425 prevents the deviation of the second coupling part 425 coupled to the first coupling part 325, and an inclined surface of the second coupling part 425 facilitates the coupling of the first and second coupling parts 325 and 425.

The guide frame 400 supports the display panel 100, and guides a position of the display panel 100 and a position of the backlight unit 200. To this end, the guide frame 400 includes a horizontally extended horizontal part 410 and a vertical part 420 which is bent vertically and extended from one end of the horizontal part 410.

The horizontal part 410 may be horizontally extended to support the display panel 100.

Figure 5A:
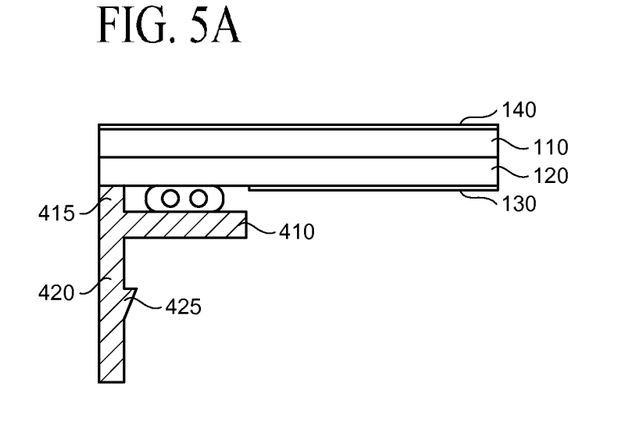
FIGS. 5A to 5C are views illustrating various embodiments of a guide frame according to the present invention.
Figure 5B:
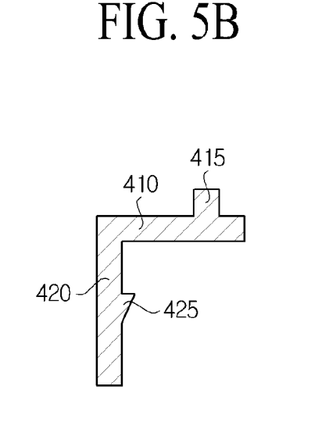
Figure 5C:
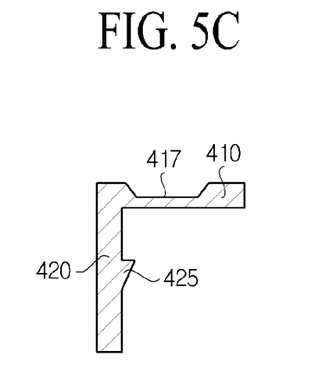

FIGS. 5A to 5C are views illustrating various embodiments of the guide frame according to the present invention.

As seen in FIGS. 5A to 5C, in an embodiment, the horizontal part 410 may include a prevention jaw 415 or an adhesive groove 417.

The prevention jaw 415 may be formed to protrude from the horizontal part 410 supporting a bottom of the display panel 100, and formed at one end and/or the other end of the horizontal part 410.

The coupling member 500 may be made of material having fluidity or viscosity, and may be inserted into the horizontal part 410. The prevention jaw 415 may guide a position at which the coupling member 500 is disposed. A height of the prevention jaw 415 may be determined such that the coupling member 500 does not pass over the prevention jaw 415. However, the prevention jaw 415 of the present invention is not limited to a position at which the coupling member 500 does not pass over the prevention jaw 415. In another embodiment, the coupling member 500 may pass over the prevention jaw 415 and may be coupled to a bottom of the display panel 100 at a top of the prevention jaw 415.

The adhesive groove 417 is concavely formed in the horizontal part 410 supporting the bottom of the display panel 100. The adhesive groove 417 may be used as a space receiving the coupling member 500. Also, the adhesive groove 417 may be used for widening an adhesive area so as to reinforce adhesive strength between the coupling member 500 and the horizontal part 410. Alternatively, the adhesive groove 417 may be formed in a structure having a plurality of protrusion portions or recessed portions.

The second coupling part 415 protrudes from an inner side surface of the vertical part 420 to have a stepped surface and an inclined surface. In an embodiment, the second coupling part 415 has been described above as protruding from the inner side surface of the vertical part 420, but the second coupling part 425 according to the present invention is not limited thereto. As another example, the second coupling part 415 may have various coupling structures in consideration of a design.

Referring again to FIG. 2, the coupling member 500 includes an adhesive member providing adhesive strength and at least one or more buffer members that are disposed inside the adhesive member 510 and have an elastic force.

The coupling member 500 is inserted between the guide frame 400 and the display panel 100 to couple the guide frame 400 to the display panel 100.

The coupling member 500 is formed of a material absorbing light or in a color absorbing light, and prevents light, emitted from the backlight unit 200, from passing through the coupling member 500. To this end, the coupling member 500 may be formed of a material that does not allow transmission of light, or in a black-based color. Irrespective of this, the coupling member 500 may be formed in the same color as the guide frame 400 in terms of an aesthetic appearance.

Figure 6A:
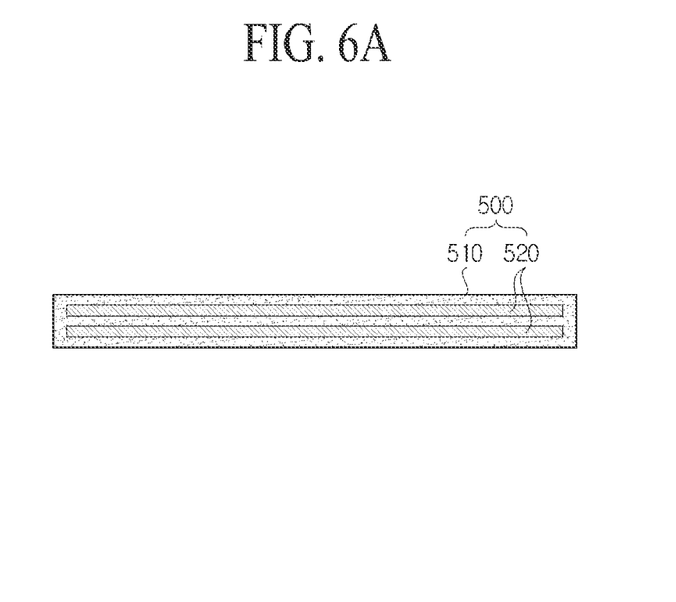
FIGS. 6A and 6B are plan views illustrating various embodiments of a coupling member according to the present invention.
Figure 6B:
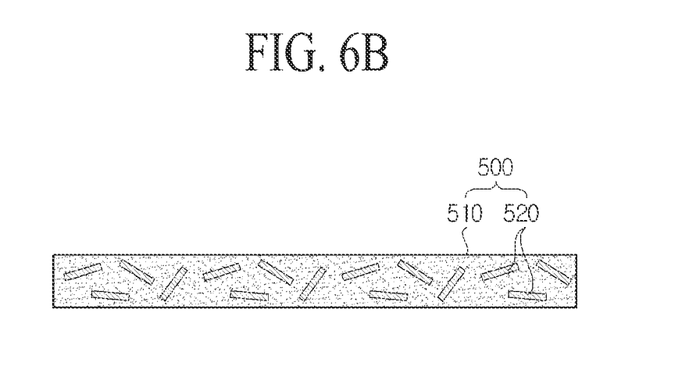
Figure 7A:
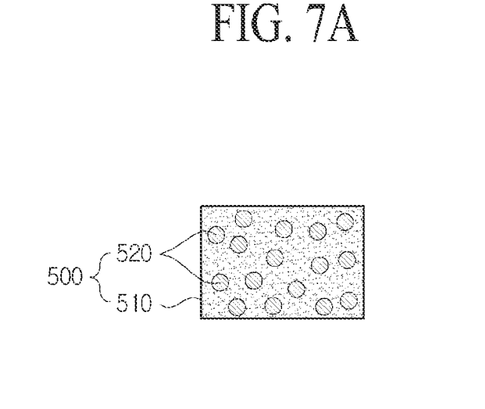
FIGS. 7A and 7B are sectional views illustrating various embodiments of the coupling member according to the present invention.
Figure 7B:
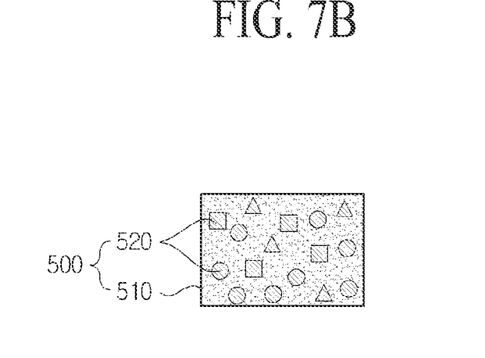

FIGS. 6A and 6B are plan views illustrating various embodiments of a coupling member according to the present invention. FIGS. 7A and 7B are sectional views illustrating various embodiments of the coupling member according to the present invention.

As seen in FIGS. 6A, 6B, 7A and 7B, the adhesive member 510 is made of material having adhesive strength and fluidity, and the coupling member 500 may be formed by combining at least one or more buffer members 520 having an elastic force with the adhesive member 510.

The adhesive member 510 may be formed of material having adhesive strength. In an embodiment, the adhesive member 510 may be formed of one of urethane-based material, acrylic-based material, epoxy-based material, and cyanoacrylate-based material.

The buffer member 520 may be formed of an elastic material, and can absorb impact. In an embodiment, the buffer member 520 may include material such as rubber, urethane, polycarbonate or the like. Also, the buffer member 520 may be colorless (or transparent) or colored (for example, blue, red, or black), but is not limited thereto. The color of the buffer member 520 may be selected according to the design of the display device.

The buffer member 520 absorbs an impact applied to the display panel 100, and may be formed in various shapes so as to maintain a constant interval between the display panel 100 and the guide frame 400.

In an embodiment of FIG. 6A, the buffer member 520 may be extended by a predetermined length in one direction and formed in a long-extended pipe shape. Also, in another embodiment of FIG. 6B, the buffer member 520 may be formed to a length different from that of FIG. 6A and irregularly intermingled with the adhesive member 510.

Moreover, in an embodiment of FIG. 7A, a sectional surface of the buffer member 520 may be formed in a circular shape or a hollow ring shape, but is not limited thereto. As another example, the sectional surface of the buffer member 520 may be formed in various angular shapes such as a triangular shape, a tetragonal shape, etc. The buffer member 520 may be provided in plurality, and the plurality of buffer members 520 may respectively have various sectional surfaces.

In each of the above-described embodiments of the present invention, the display device has been described as being an LCD device including the display panel 100 and the backlight unit 200. However, the display device according to the present invention is not limited thereto, and for example, the display panel 100 may be replaced by an organic light emitting display panel including a plurality of organic light emitting elements. In this case, since the organic light emitting display panel is a self-emitting element, the backlight unit 200 is not provided.

In this case, the display panel 100 that is the organic light emitting display panel may include a lower substrate and an upper substrate facing and coupled to the lower substrate.

The lower substrate includes a plurality of emission pixels that are respectively formed in a plurality of areas defined by a plurality of gate line, data lines, and power lines. Each of the emission pixels may include at least one switching transistor connected to a gate line and a data line, at least one driving transistor connected to the switching transistor and a power (VDD) line, and a light emitting element that emits light with a current controlled according to the switching of the driving transistor.

The upper substrate faces and is coupled to the lower substrate, and protects the plurality of light emitting elements formed in the lower substrate. Here, the upper substrate may include a plurality of light emitting elements respectively connected to the plurality of driving transistors formed in the lower substrate, in which case the light emitting elements are not provided in the lower substrate.

Figure 8A:
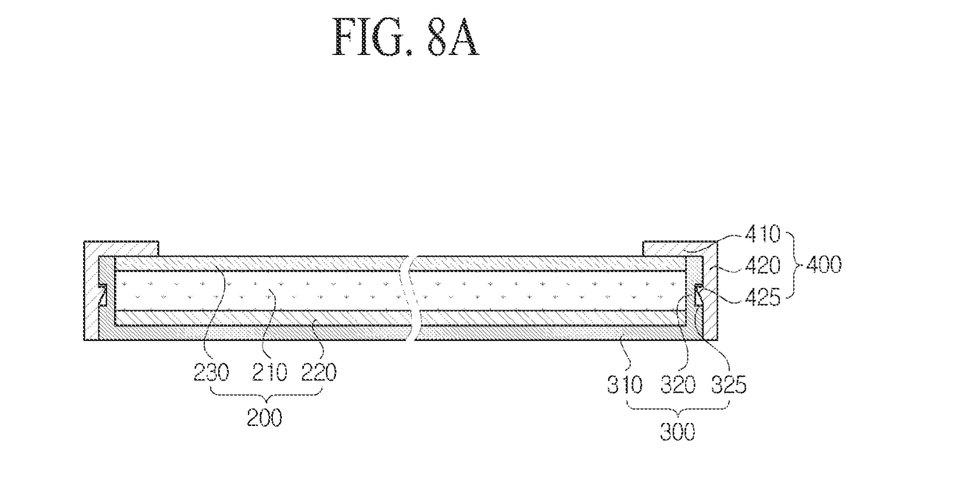
FIGS. 8A to 8C are views illustrating an embodiment of a method of manufacturing a display device according to the present invention.
Figure 8B:
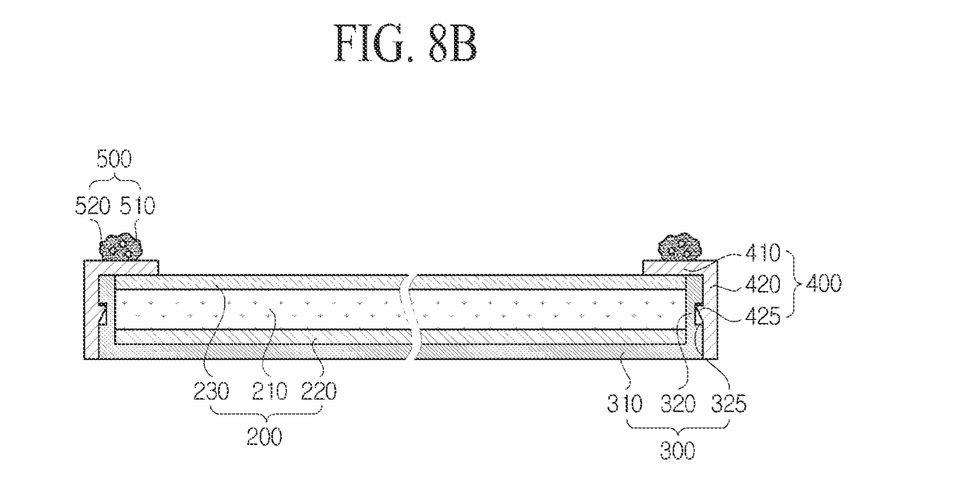
Figure 8C:
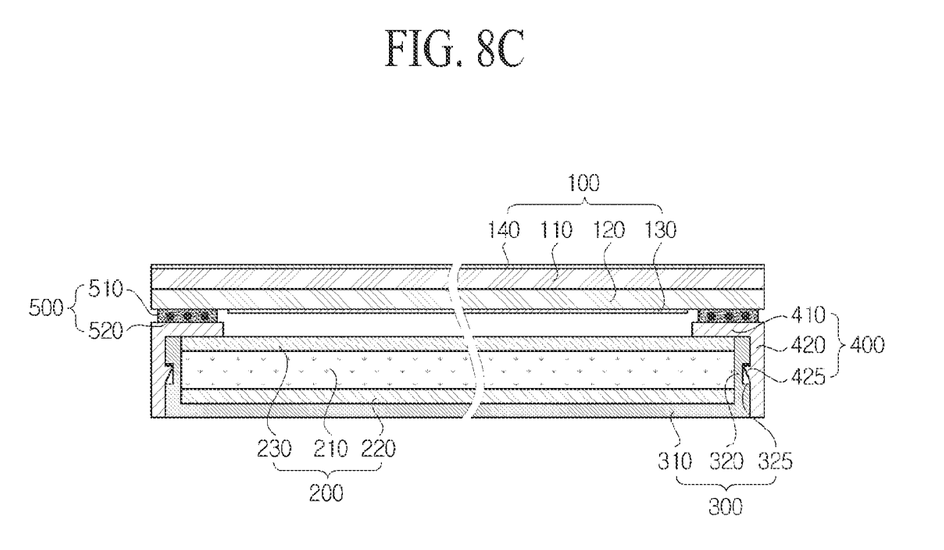

FIGS. 8A to 8C are views illustrating an embodiment of a method of manufacturing a display device according to the present invention.

As seen in FIG. 8A, the backlight unit 200 supplying light to the display panel 100 is placed in the cover member 300. The guide frame 400, which exposes the side surfaces of the display panel 100 and includes the horizontal part 410 supporting the bottom of the display panel 100 and the vertical part 420 extended from the horizontal part 410, is prepared on the cover member 300 with the backlight unit 200 placed therein.

As seen in FIG. 8B, the coupling member 500 that couples the guide frame 400 to the display panel 100 is injected into the horizontal part 410. The coupling member 500 may be formed by combining the at least one or more buffer members having an elastic force with the adhesive member 510 providing adhesive strength.

In this case, when an accurate amount of coupling member 500 is injected, the injection of the coupling member 500 into the backlight unit 200 can be prevented. In an embodiment, a dispenser may be used for injecting an accurate amount of adhesive member 510.

As seen in FIG. 8C, the guide frame 400 is coupled to the display panel 100. In this case, the adhesive member 510 still has fluidity and is insufficient in adhesive strength, and thus, the adhesive member 510 is hardened under a normal temperature after a predetermine time elapses, hardened by applying heat at a predetermine temperature, or hardened by irradiating ultraviolet (UV).

According to the display device and the method of manufacturing the same according to the present invention, by removing an upper case and a front set cover, a thickness and a front border width are reduced, and a step height of a front border portion is removed, thus enhancing aesthetic appearance of the design.

Moreover, adhesive strength between the display panel and the guide panel can be enhanced, and thus, the display panel and the guide panel can be adhered to each other with a small adhesive area.

Moreover, the display panel absorbs impact applied thereto, thus enhancing the stability of the display panel.

Moreover, light leakage can be reduced between the display panel and the guide panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
   a display panel including an upper substrate and a lower substrate facing and coupled to a rear surface of the upper substrate;
   a guide frame supporting the display panel; and
   a coupling member coupling the guide frame to the display panel,
   wherein the coupling member comprises an adhesive member providing adhesive strength and a plurality of elastic buffer members each of which have an elastic force and are disposed inside the adhesive member, wherein the plurality of elastic buffer members are of different length and are irregularly intermingled in the adhesive member, wherein at least one or more elastic buffer members of the plurality of elastic buffer members have circular shaped cross sections.

2. The display device of claim 1, wherein the guide frame exposes a side surface of the display panel, and comprises a horizontal part supporting a bottom of the display panel and a vertical part extended from the horizontal part, and the display panel extends to and overlaps with the vertical part of the guide frame.

3. The display device of claim 1, wherein the guide frame comprises a side part covering a side surface of the display panel, the side part being provided to the same height as the display panel and not being provided at a top of the display panel.

4. The display device of claim 1, wherein the guide frame comprises a prevention jaw formed to protrude from a horizontal part that supports a bottom of the display panel.

5. The display device of claim 1, wherein the guide frame comprises an adhesive groove concavely formed in a horizontal part that supports a bottom of the display panel, and receiving the coupling member.

6. The display device of claim 1, wherein the coupling member is formed of a light-absorbing material or in a light-absorbing color, and prevents the light from passing through the coupling member.

7. The display device of claim 1, wherein the adhesive member is one of urethane-based material, acrylic-based material, epoxy-based material, and cyanoacrylate-based material.

8. The display device of claim 1, further comprises:
a cover member having a first coupling part concavely formed for supporting an inner side surface of the guide frame; and
wherein the guide frame includes a second coupling part protrudingly formed corresponding to the first coupling part.

9. The display device of claim 1, wherein the at least one or more elastic buffer members of the coupling member extend in one direction and are pipe shaped.

10. A display device, comprising:
a display panel including an upper substrate and a lower substrate facing and coupled to a rear surface of the upper substrate;
a guide frame supporting the display panel; and
a coupling member coupling the guide frame to the display panel,
wherein the coupling member comprises an adhesive member providing adhesive strength and a plurality of elastic buffer members each of which have an elastic force and are disposed inside the adhesive member, wherein the plurality of elastic buffer members are of different length and are irregularly intermingled in the adhesive member, wherein at least one or more elastic buffer members of the plurality of elastic buffer members have hollow ring shaped cross sections.

11. A display device, comprising:
a display panel including an upper substrate and a lower substrate facing and coupled to a rear surface of the upper substrate;
a guide frame supporting the display panel; and
a coupling member coupling the guide frame to the display panel,
wherein the coupling member comprises an adhesive member providing adhesive strength and a plurality of elastic buffer members each of which have an elastic force and are disposed inside the adhesive member, wherein the plurality of elastic buffer members are of different length and are irregularly intermingled in the adhesive member, wherein at least one or more elastic buffer members of the plurality of elastic buffer members have angular shaped cross sections.

12. The display device of claim 11, wherein the at least one or more elastic buffer members have triangular shaped cross sections.

13. The display device of claim 10, wherein the at least one or more elastic buffer members of the coupling member extend in one direction and are pipe shaped.

14. The display device of claim 11, wherein the at least one or more elastic buffer members of the coupling member extend in one direction and are pipe shaped.

15. A display device, comprising:
a display panel including:
an upper substrate,
a lower substrate facing and coupled to a rear surface of the upper substrate,
a liquid crystal layer between the lower substrate and upper substrate, and
a plurality of pixels adjusting light transmittance of the liquid crystal layer in accordance with corresponding data voltages applied to the plurality of pixels;
a guide frame supporting the display panel; and
a coupling member coupling the guide frame to the display panel,
wherein the coupling member comprises an adhesive member and at least one or more elastic buffer members disposed inside the adhesive member;
wherein the guide frame exposes a side surface of the display panel, and comprises a horizontal part supporting a bottom of the display panel and a vertical part extended from the horizontal part, and the display panel extends at least to and overlaps with the vertical part of the guide frame.

16. The display device of claim 15, further comprising:
a cover member having a first coupling part concavely formed for supporting an inner side surface of the guide frame; and
wherein the guide frame includes a second coupling part protrudingly formed corresponding to the first coupling part.

17. The display device of claim 15, wherein the guide frame comprises an adhesive groove concavely formed in a horizontal part that supports a bottom of the display panel, and receiving the coupling member.

18. The display device of claim 15, wherein the coupling member is formed of a light-absorbing material or in a light-absorbing color, and prevents the light from passing through the coupling member.

* * * * *